J. GUILLE.
LOAD CARRYING ATTACHMENT FOR MOTOR CARS.
APPLICATION FILED MAY 24, 1921.
1,418,438. Patented June 6, 1922.
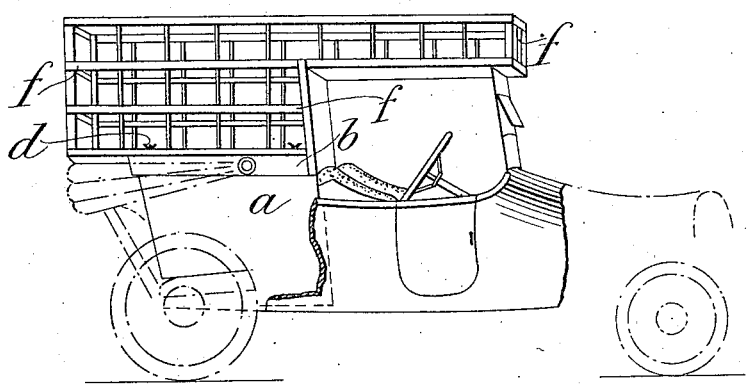
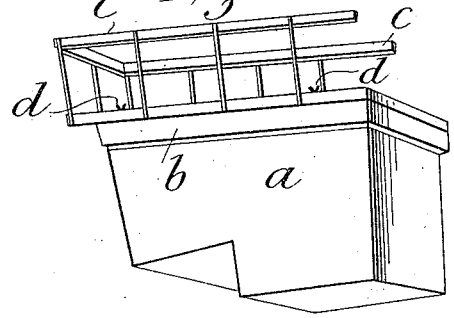
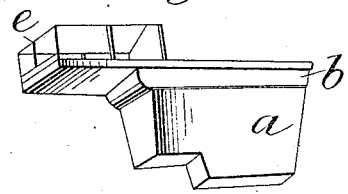

UNITED STATES PATENT OFFICE.

JOHN GUILLE, OF GUERNSEY, CHANNEL ISLANDS.

LOAD-CARRYING ATTACHMENT FOR MOTOR CARS.

1,418,438.　　　　Specification of Letters Patent.　　Patented June 6, 1922.

Application filed May 24, 1921. Serial No. 472,062.

*To all whom it may concern:*

Be it known that I, JOHN GUILLE, a subject of the King of Great Britain and Ireland, residing at Guernsey, Channel Islands, have invented a Load-Carrying Attachment for Motor Cars, of which the following is a specification.

The object of the present invention is to enable any ordinary type of touring or other motor car to be quickly and reliably converted into a commercial vehicle for the transport of goods.

To this end it consists broadly in the provision of an auxiliary body which can be lifted into and out of the ordinary body of the car and need require no fixing means although these may be provided if desired. The said auxiliary body may be of a rigid character or capable of being collapsed, folded or rolled up. Thus it may be a single structure or it may comprise a main part capable of being itself augmented so that it may extend beyond or overhang the rear of the car, the driver, or both, in order to increase the carrying capacity. In a similar way the auxiliary body may be a receptacle conforming to the interior of the car body but made of waterproofed or other flexible material that may be inserted in the body and secured at the edges by any suitable means.

The invention is capable of being variously carried into effect but preferably an auxiliary rigid body is employed shaped to suit the interior of the car to which it is to be applied, such body extending to, or nearly to, the floor level so that it occupies the well of the car as well as the space above the seat, although if the latter is removable it can be made deeper at such region.

In any case the body is made to fit snugly so that its own weight will serve to hold it securely in place when empty. This body part may be made of any suitable material or materials, the walls being preferably of a non-openwork character so that nothing can escape to damage or soil the car proper. The upper edge of the auxiliary body may be extended upwardly by skeleton walls removably attached, or hinged, thereto. Or said edges may be so constituted as to act as a base for a super-structure which may be removably bolted or otherwise secured thereto. Such superstructure may be of a crate-like character, overhanging the hood and, it may be, the rear of the car. If high enough such superstructure may be extended forwardly so as to project over the driver.

As will be understood more than one superstructure may be employed, any single one being used as occasion demands.

The manner in which the invention may be carried into effect will be readily understood from the accompanying drawings whereof Fig. 1 is a conventional view of a portion of a motor car showing one arrangement; Figs. 2 and 3 are perspective views of two modified arrangements.

As shown in each of these figures the auxiliary body $a$ is shaped to fit the interior of the motor car as in Fig. 1 so that it rests snugly therein without play which will usually be found to be sufficient to prevent it moving whilst the car is traveling. As already explained such an auxiliary body may be used alone but if it be desired to augment the carrying capacity it may be provided at each side with a rail $b$ to which a superstructure such as $c$ (Fig. 2) may be removably attached as by means of bolts $d$ having wing nuts, such superstructure not substantially overhanging the back of the auxiliary body.

In other cases a superstructure such as shown at $e$ in Fig. 3 may be employed which almost entirely overhangs the back of the auxiliary body, whilst as a third alternative a superstructure such as shown at $f$ in Fig. 1 may be adopted which partially overhangs the back of the auxiliary body and is of a height to permit of a portion to extend over the driver. The latter structure is more especially adopted when bulky but light goods are to be carried.

What I claim is:—

1. A goods carrying device comprising a structure shaped to conform substantially to the interior of the body of a touring car and adapted to be temporarily inserted in said body, and a skeleton superstructure rearwardly overhanging the said structure.

2. A goods carrying device comprising a structure shaped to conform substantially to the interior of the body of a touring car and adapted to be temporarily inserted in said body, and a skeleton superstructure forwardly overhanging the said structure.

3. A goods carrying device comprising a structure shaped to conform substantially to the interior of the body of a touring car and adapted to be temporarily inserted in said body, and a skeleton superstructure overhanging the said structure both rearwardly and forwardly.

Signed at St. Peterport in the Island of Guernsey, this twenty-third day of April, 1921.

JOHN GUILLE.